United States Patent [19]

Nakagawa et al.

[11] Patent Number: 5,206,085
[45] Date of Patent: Apr. 27, 1993

[54] PREFORMED YARN USEFUL FOR FORMING COMPOSITE ARTICLES AND PROCESS FOR PRODUCING SAME

[75] Inventors: Takao Nakagawa, Kashiwa; Mihoko Yamashita, Tokyo; Masaharu Tachibana; Shoko Namba, both of Funabashi; Takuya Ueda, Zushi, all of Japan

[73] Assignee: Across Co., Ltd., Japan

[21] Appl. No.: 700,897

[22] Filed: May 13, 1991

Related U.S. Application Data

[63] Continuation of Ser. No. 230,499, Aug. 10, 1988, abandoned.

[30] Foreign Application Priority Data

Aug. 13, 1987 [JP] Japan ............... 62-202761

[51] Int. Cl.$^5$ ............................................. D02G 3/00
[52] U.S. Cl. ............................ 428/372; 428/374; 428/375; 428/373; 57/258; 57/401; 264/131; 264/136
[58] Field of Search ........... 428/372, 373, 374, 375; 57/258, 401; 264/131, 136

[56] References Cited

U.S. PATENT DOCUMENTS

| | | | |
|---|---|---|---|
| 3,354,013 | 11/1967 | Terrell et al. | 427/185 X |
| 3,770,488 | 11/1973 | Pepper et al. | 57/258 X |
| 3,862,287 | 1/1975 | Davis | 264/131 |
| 3,886,015 | 5/1975 | Turner | 428/373 |
| 4,534,919 | 10/1985 | McAliley et al. | 264/29 |
| 4,543,274 | 9/1985 | Mulder | 427/180 X |
| 4,614,678 | 9/1986 | Ganga | 428/294 X |
| 4,743,413 | 5/1988 | Galichon | 264/136 X |
| 4,772,502 | 9/1988 | Okura et al. | 428/373 |
| 4,839,199 | 6/1989 | de Jager | 427/185 |

FOREIGN PATENT DOCUMENTS 1257643 12/1971 United Kingdom .

*Primary Examiner*—Patrick J. Ryan
*Assistant Examiner*—Newton O. Edwards
*Attorney, Agent, or Firm*—Lorusso & Loud

[57] ABSTRACT

A preformed yarn useful for forming composite articles is disclosed which includes a core of a multiplicity of fibers, fine powder provided in the interstices between the fibers, and a flexible sleeve formed of a thermoplastic resin and surrounding the core. The fine powder is formed of a material which neither melts nor reacts with the thermoplastic resin at a temperature up to 450° C. and at a temperature up to the melting point of the thermoplastic resin. The incorporation of the fine powder between the fibers is effected by injecting fine powder-containing air from a jet nozzle and blowing the air against a bundle of the fibers.

8 Claims, 1 Drawing Sheet

PREFORMED YARN USEFUL FOR FORMING COMPOSITE ARTICLES AND PROCESS FOR PRODUCING SAME

This application is a continuation of application Ser. No. 07/230,499, filed Aug. 10, 1988, now abandoned.

BACKGROUND OF THE INVENTION

This invention relates to a preformed yarn useful for the formation of thermoplastic, shaped, composite articles and to a method of producing same.

Well known composite materials include prepregs formed by coating a tow or a woven cloth of reinforcing fibers with a solution or a low-viscosity melt of a thermosetting resin. The prepreg, however, is extremely high in adhesiveness and poor in flexibility so that it has problems in handling and post processing. Also known is a tape of a reinforcing fiber-containing thermoplastic resin prepared by extruding a reinforcing fiber tape in which a thermoplastic resin having a high melting point is impregnated. This tape is, however, in the state of an extremely rigid board so that it causes difficulties in the formation of woven clothes and moreover it cannot be subjected to drape forming using molds with complex shapes.

In order to overcome these drawbacks, there has been proposed a flexible composite material (U.S. Pat. No. 4,614,678 issued to Ganga) which is formed by covering coarse fiber filaments, impregnated by a thermoplastic resin powder, with a flexible covering material. While this composite material is suitable for draping through molds with complex shapes in terms of flexibility as compared to known reinforcing fiber-containing thermoplastic resin tapes, it still suffers from the following drawbacks. Firstly, the composite material presents a difficulty in providing a uniform blend ratio of the reinforcing filaments and the thermoplastic resin powder, since the impregnation of the filaments with the powder is effected by contact of the filaments with a fluidized layer of the powder. As a result, the material properties of the resulting molded products obtained with such a composite material are not uniform. Secondly, in the production of the composite material, it is necessary to use thermoplastic resin powder whose average particle sizes distribute within a narrow range in order to maintain a stable fluidized state of the resin powder. This will increase the cost of production. Thirdly, since thermoplastic resin powder having a particle size greater than the diameter of the reinforcing filaments is used in relatively a large amount, the composite material becomes volumesome. This will cause a difficulty in handling during the drape forming of the material.

SUMMARY OF THE INVENTION

It is, therefore, the prime object of the present invention to provide a preformed yarn which is useful for forming shaped articles by draping.

It is a special of object of the present invention to provide a preformed yarn which is useful for forming fiber-reinforced, composite articles having improved mechanical properties such as tensile strength and bending strength.

It is a further object of the present invention to provide a method for the fabrication of a preformed yarn of the above-mentioned type.

In accomplishing the foregoing objects, there is provided in accordance with the present invention a preformed yarn consisting essentially of:
a core of a multiplicity of fibers;
a fine powder provided in the interstices between said fibers; and
a flexible sleeve formed of a thermoplastic resin and surrounding said core,
said fine powder being formed of a material which neither melts nor reacts with said thermoplastic resin at a temperature up to 450° C. and at a temperature up to the melting point of said thermoplastic resin.

In another aspect, the present invention provides a process for the preparation of a preformed yarn comprising the steps of:
continuously passing a bundle of a multiplicity of fibers through a jet flow of a gas containing fine powder to loosen the bundle with the powder being taken in the interstices between the loosened fibers;
assembling said powder-carrying fibers to form a core; and
extruding a thermoplastic resin over said core to form a sleeve surrounding said core,
said fine powder being formed of a material which neither melts nor reacts with said thermoplastic resin when heated to a temperature at which said thermoplastic resin melts.

The preformed yarn according to the present invention allows a free and quantitative determination of blending ratios for the fiber and the fine powder, since the fine powder having an extremely small particle size is used in a small amount. As a result, the preformed yarn is superior in flexibility, uniformity and processability in comparison with the known flexible composite material. Especially when the fibers constituting the core are reinforcing fibers such as carbon fibers, the preformed yarn can give composite articles having excellent mechanical strengths such as tensile strength and bending strength, because the fibers of the yarn are separated from each other by the fine powder interposed between them, thereby to permit the thermoplastic material forming the sleeve to enter the interstices between the fibers during the formation of the composite article and because the fibers are not curled at all.

Also the preformed yarn according to the present invention is provided with a flexible, thermoplastic resin sleeve around the core so that it can prevent air or moisture from permeating into the yarn, thereby providing a remarkable improvement in the mechanical properties of the molded articles produced therefrom. The preformed yarn does not form fuzz on its surface and permits easy woving or winding.

BRIEF DESCRIPTION OF THE DRAWINGS

Other objects, features and advantages of the present invention will become apparent from the detailed description of the invention which follows, when considered in light of the accompanying drawings, in which.

DETAILED DESCRIPTION OF THE INVENTION

Figure 1:
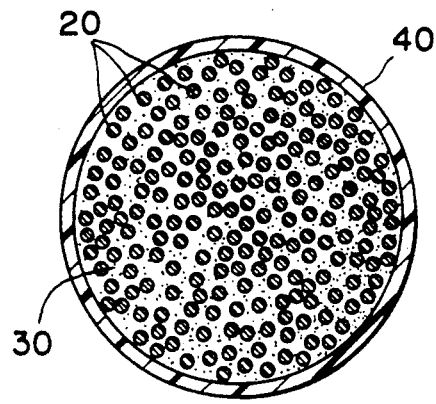
FIG. 1 is a cross section of a preformed yarn according to the present invention.

Referring first to FIG. 1, the reference numeral 20 designates fibers, generally continuous fibers, constituting a core. The reinforcing fibers 20 are preferably infusible, reinforcing fibers such as carbon fibers, glass fibers, aramide fibers (aromatic polyamide fibers), boron fibers, ceramic fibers, metal fibers and mixtures thereof. The carbon fibers may be pitch-derived carbon fibers obtained from petroleum or coal tar pitch or PAN-type carbon fibers obtained from acrylic fibers. The glass fibers may be of a strand-type or non-strand-type. The ceramic fibers may be CSi fibers, SiN fibers, BN fibers or alumina fibers. The reinforcing fibers 20 preferably have a filament denier number ranging from about 0.05 to about 600 and filament counts ranging from about 50 to about 300,000, more preferably a filament denier number ranging from about 0.25 to about 16 and filament counts ranging from about 100 to about 48,000.

The amount of the reinforcing fibers is preferably about 30-70% based on the total volume of the preformed yarn. When the content of the reinforcing fibers is below 30% by volume, the composite articles obtained therefrom tends to be unsatisfactory in mechanical strength. On the other hand when the amount of the reinforcing fibers exceeds 70% by volume, the fibers in the composite articles tend to be degraded because of the lack of uniformity.

Referring continuously to FIG. 1, in the interstices between the fibers 20 are provided finely divided powder 30. The fine powder serves to provide the reinforcing fibers 20 with slippage and to maintain them in a slightly loosened state so that, during the molding stage, the molten thermoplastic resin surrounding the core (the resin of a sleeve which will be described hereinafter) can well enter into the interstices between the fibers 20, thereby to permit the formation of a uniform matrix of the resin when the resin is resolidified.

It is important that the fine powder should neither melt nor react with the thermoplastic resin surrounding the core at a temperature of up to 450 ° C. or at a temperature below the melting point of the thermoplastic resin surrounding the core. As long as this criterion is met, the material of the fine powder 30 is not specifically limited. Examples of suitable materials for the fine powder include carbon such as graphite, carbon black or activated carbon; a metal or metal compound such as $Al_2O_3$, $SiO_2$, $Al_2O_3$-$SiO_2$, $CaCO_3$, $Ca_2SiO_4$, $MoO_2$, $MoS_2$, quartz or glass; or an organic polymer such as tetrafluoroethylene.

It is preferred that the fine powder 30 have an average specific surface area diameter of $\frac{1}{3}$ (one third) of the diameter of the fiber 20. More particularly, the average specific surface area diameter of the fine powder 30 is preferably 15 $\mu$m or less, more preferably about 0.01-5 $\mu$m, most preferably about 0.02-2 $\mu$m. The term "average specific surface area diameter" used herein is intended to refer to an average diameter measured by the porosiometry method using the Lea-Nurse device and calculated according to the Konzeny-Carman equation as disclosed in "Powder Engineering (Basic)" (published: Maki Shoten, authors: Kawakita, Koishi and Tanetani), p.81 (1981).

The fine powder 30 is preferably present in an amount of about 0.01-10% by volume, more preferably about 0.2-5% by volume of the reinforcing fibers 20. An amount of the powder 30 in excess of about 10% by volume causes reduction of the tensile and bending strength of the molded articles obtained from the preformed yarn. On the other hand, when the amount is below about 0.01% by volume, the fibers 20 fail to be separated by the powder 30, thereby resulting in lack of uniformity.

As shown in FIG. 1, the core of a multiplicity of the fibers 20 holding therebetween the powder 30 is covered with a flexible sleeve or sheath 40 formed of a thermoplastic resin. The sleeve 40 melts during the formation of molded articles and forms a matrix when resolidified.

The sleeve 40 is preferably formed of a polyamide, a polyester, a polyolefin, a polystyrene, a polyvinylidene fluoride, a polyamideimide, a polyimide, a polyetherimide, a polyethersulfone, a polyether ketone, a polyphenylene sulfide. Examples of the polyolefin include polyethylene and polypropylene. Examples of the polyamide include nylon 66, nylon 6, nylon 12 and nylon 6/66/12 terpolymer. Illustrative of suitable polyesters are polyethylene terephthalate, polybutylene terephthalate, polyethylene 2,6,-naphthalate, polyoxyethoxy benzoate and other aromatic polyesters. The thermoplastc resin sleeve 40 preferably has a melting point of about 120°-500 ° C.

The sleeve 40 preferably has a thickness of about 5-1000 $\mu$m, more preferably about 10-300 $\mu$m. It is difficult to prepare a sleeve 40 with a thickness of below 5 $\mu$m. A thickness of the sleeve 40 above 1000 $\mu$m tends to reduce the flexibility of the preformed yarn. It is preferred that the sleeve 40 be in close contact or shrunk fit with the core so as to minimize the void space between the core and sleeve and within the core. Such a close contact is desirable for minimizing the inclusion of air in the preformed yarn and, therefore, minimizing the occurrence of pores within the final composite articles.

The preformed yarn in which the fibers 20 constituting the core are formed of a thermoplastic resin which may be the same as or different from the material forming the sleeve 40 is within the scope of the present invention. In this case, the the core of thermoplastic resin fibers 20 and the thermoplastic resin sleeve 40 are melted during a molding step and the melted mass is resolidified to give a molded article formed of the resin and having dispersed therein the fine powder 30. In this case, the fine powder 30 serves to impart to the molded article an electric conductivity, an abrasion resistance, an impact strength, a rigidity, an anti-friction property or the like property. Thus, the fine powder 30 is selected according to the end use of the molded articles. For instance, carbon powder is used to obtain an electrically conducting molded article. The amount and the particle size of the fine powder are not of a great importance since the mechanical strength of the molded articles is no longer important. Thus, the amount of the fine powder 30 is generally 0.1-90%, preferably 1-80% by volume based on the volume of the preformed yarn and the average specific surface area diameter is generally 100 $\mu$m or less.

The process for the fabrication of the above-described preformed yarn will now be described below with reference to FIG. 2. A bundle of continuous fibers 20 wound on a bobbin (not shown) is continuously fed through an unwinding equipment 1 to a powder impregnation device generally designated as 2. The powder impregnation device 2 includes a housing 21, and an air jet nozzle member 3 disposed within the housing 21. An air feed pipe 6 leading from a compressor 22 is connected to the nozzle member 3. A powder feeder 5 is connected to the feed pipe 6 to continuously feed a quantity of fine powder 30 to the compressed air flowing through the feed pipe 6. The nozzle member 3 has a central bore 23 through which the fibers 20 are passed. A plurality of orifices 24 are provided in the nozzle member 3 so that the compressed air carrying fine powder 30 is injected from each orifice 24 toward the fibers 20 running through the bore 23. As a result, the bundle of the fibers 20 is loosened and inflated by the jet blows and at the same time the fine powder 30 is intruded into the bundle and caught between the fibers 20.

The inflated bundle of the fibers 20 holding the powder therebetween is then assembled into a core of a desired diameter by means of assembling rollers 4 and 4a disposed in the housing 21. The powder 30 which has not been caught by the fibers 20 is withdrawn from the housing 21 through a discharge pipe 7 by the action of a suction pump 9 connected to the pipe 7. A recovering means 8 such as a bag filter is provided in the pipe 7 for collecting the powder 30. The fine powder thus collected in the filter 8 may be recycled into the powder feeder 5. Designated as 25 is an air feed conduit for supplying air to the housing 2 and for creating a gas stream in the vicinity of inlet and outlet 26 and 27 of the housing 21 to prevent the powder from escaping through the inlet and outlet 26 and 27.

The core of the fibers 20 into which the fine powder 30 have been incorporated is then covered with a sleeve 40 in a sleeve forming device composed of a cross head 11 and an extruder 10. Designated as 15 is a vacuum pump connected to the cross head 11 for shrinkingly fitting the sleeve over the core and for providing tight bonding between the sleeve and the core.

The resulting preformed yarn is then cooled in a cooling zone 12 and wound on a take-up roller 14. Designated as 13 is a Nelson-type feed roller for drawing the preformed yarn at a constant speed.

If desired, the core provided with the sleeve therearound may be processed, before cooling, by means of a stamping or knot forming device to form a plurality of axially spaced apart, thin, annular, depressed portions on the outer periphery of the sleeve by radially inwardly pressing, with heating, the preformed yarn so as to tighten the sleeve and the core together. The provision of the knots is desirable in an instance where the preformed yarn is cut into desired lengths, since escape of the powder from the cut yarn can be minimized.

The preformed yarn according to the present invention may be used as a raw material for the production of molded articles by, for example, filament winding or hot pressing techniques. In the case of filament winding, the preformed yarn is wound on a mandrel or a former and heated under pressure at a temperature sufficient to melt or fuse the thermoplastic resin sleeve and, as the case may be, the thermoplastic fibers. The molten resin is then resolidified and the mandrel or former is removed to give a desired molded article. The mandrel is not removed when it is to constitute a part of the article. In the case of press molding, the preformed yarn is placed in a mold cavity, heated at a temperature higher than the melting point of the resin and then resolidified. The preformed yarn is very suited for the production of composite articles having complex shapes and small radii of curvature, such as structural parts for automobiles, tennis racket frames, hockey sticks, skiing stocks, fishing rods and golf club shafts. The preformed yarn may be formed into woven clothes or mats before molding.

The following examples will further illustrate the present invention.

EXAMPLE 1

Figure 2:
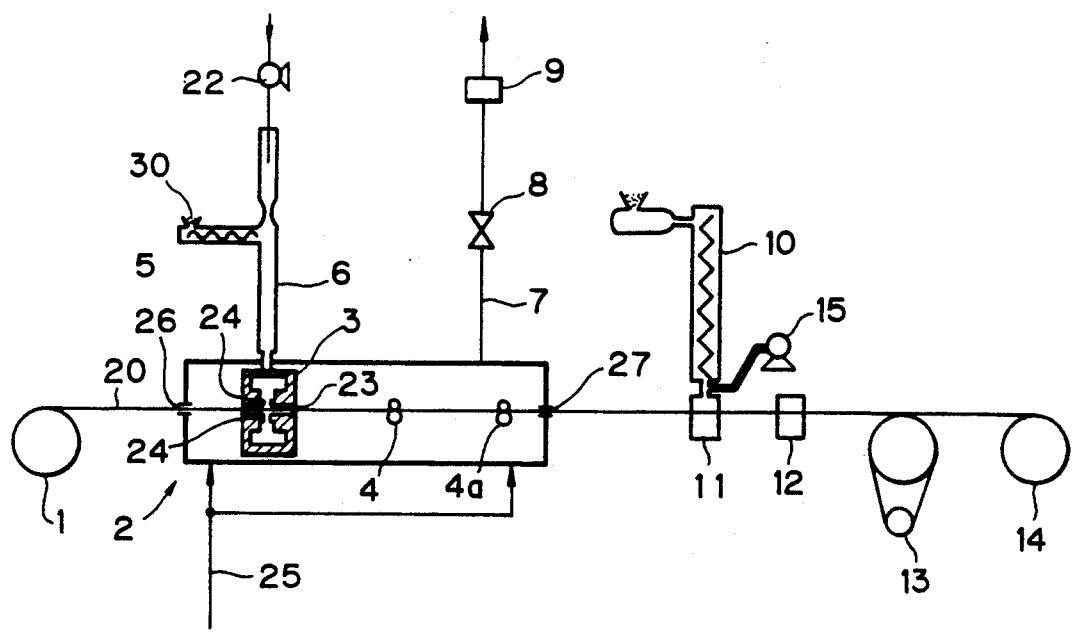
FIG. 2 is a diagrammatic illustration of an apparatus suitable for the preparation of the preformed yarn according to the present invention.

A preformed yarn was prepared using the apparatus shown in FIG. 2. A bundle of carbon fibers obtained from an acrylonitrile copolymer and wound around a bobbin was mounted on an unwinding equipment 2. The carbon fibers had a filament count of 6000, a density of 1.76 g/cm$^3$, a tensile strength of 360 kg/mm$^2$, a modulus of $23.5 \times 10^3$ kg/mm$^2$ and an elongation of 1.5%. The bundle was continuously drawn by a Nelson type feed roller 13 at a constant speed and was passed through a powder impregnation device 3. Carbon black having a density of 1.83 g/cm$^3$ and an average specific surface area diameter of 0.07 μm was used as the fine powder and was charged in a hopper feeder 5 which was connected to a gas feed pipe 6. During its passage through the impregnation device 2, the bundle of carbon fibers was subjected to a jet flow of air containing the fine powder so that the fiber bundle was loosened and inflated with the fine powder being taken in the interstices between the fibers. The resulting fibers were passed through assembling rolls 4 and 4a to form a core with a predetermined diameter. A controlled tension of about 30 g was applied to the fibers throughout the impregnation step. Excess fine powder in a housing 21 was continuously withdrawn therefrom by a suction device 9 and collected in a bag filter 8.

The core formed of the carbon fibers carrying the carbon black powder was then fed to a sleeve forming cross-head 11 where a thermoplastic resin (polyphenylene sulfide having a density of 1.37 g/cm$^3$, a bending strength of 12.7 kg/mm$^2$ and a bending modulus of 350 kg/mm$^2$) was extruded over the core to form a sleeve over the surface of the core. The sleeve had an outer diameter of 2 mm and a thickness of 37 μm. The resulting yarn was cooled with a cooling device 12 and wound by a winding device 14. The extruder 18 had a screw diameter of 25 mm and an extruding velocity of 1.36 liter/hour, and the temperature of the cross head die was set at 281° C. The drawing velocity was 100 m/min. The volume ratio of the carbon fibers, the sleeve and the carbon black of the preformed yarn was 50.0:49.9: 0.1.

The thus obtained preformed yarn was tightly wound around an aluminum alloy plate having a width of 50 mm, a length of 200 mm and a thickness of 5 mm, to a thickness of about 3 mm. The resultant plate was inserted into a mold cavity of a press mold apparatus. The mold was heated to 325° C. and maintained at that temperature for 10 minutes. After applying a pressure of 40 Kg/cm$^2$, the mold was allowed to be spontaneously cooled to ambient temperature, thereby to obtain a molded product. The resin layer of the molded product had a tensile strength of 151.2 kg/mm$^2$ and a bending strength of 176.4 kg/mm$^2$ Analysis of the cross section of the molded product revealed that the carbon fibers were uniformly distributed in the resin matrix.

EXAMPLE 2

A preformed yarn was prepared using the apparatus shown in FIG. 2 in a manner similar to that of Example 1. As the reinforcing fibers, a bundle of glass fibers having a filament count of 2000, a density of 2.57 g/cm$^3$, a tensile strength of 160 kg/mm$^2$, a modulus of $6.4 \times 10^3$ kg/mm$^2$ and an elongation of 2.9% was used. As a thermoplastic resin for the formation of the sleeve, a high molecular weigh polyethylene having a density of 0.94 g/cm$^3$, a bending strength of 4.1 kg/mm$^2$ and a bending modulus of 95 kg/mm$^2$) was used. As the fine average specific surface area diameter of 1.0 μm was used. The sleeve had an outer diameter of 2.5 mm and a thickness of 40 μm. The extruder 18 had a screw diameter of 25 mm and an extruding velocity of 1.87 liter/hour, and the temperature of the cross head die was set at 210° C. The drawing velocity was 100 m/min. The volume ratio of the glass fibers, the sleeve and the alumina powder of the preformed yarn was 50.0:49.9:0.1.

The resulting preformed yarn was subjected to press molding in the same manner as that in Example 1 at a molding temperature of 215° C. The molded product had a tensile strength of 118.8 kg/mm$^2$ and a bending strength of 138.6 kg/mm$^2$ Analysis of the cross section of the molded product revealed that the glass fibers were uniformly distributed in the resin matrix.

COMPARATIVE EXAMPLE 1

Example 1 was repeated in the same manner as described except that the carbon black was not used. Thus, a bundle of carbon fibers was directly fed to the sleeve forming step without passing through the powder impregnation device. The extrusion speed of 1.38 liter/hour, the cross head die temperature was 320° C. and the drawing velocity of 100 m/min were used. The sleeve had an outer diameter of 2 mm and a thickness of 37 μm. The volume ratio of the fibers to the sleeve was 50:50. The molded product had a tensile strength of 100.5 kg/mm$^2$ and a bending strength of 117.0 kg/mm$^2$ An analysis of the cross section of the molded product revealed that the thermoplastic resin was failed to be sufficiently intruded between the fibers.

COMPARATIVE EXAMPLE 2

Example 1 was repeated in the same manner as described except that the carbon black was replaced by polyphenylene sulfide powder with an average specific surface area diameter of 20 μm and that the impregnation of the powder was effected by passing the fibers, which had been spread and separated, through a fluidized layer of the powder. The extrusion speed of 0.69 liter/hour, the cross head die temperature was 320° C. and the drawing velocity of 100 m/min were used. The sleeve had an outer diameter of 3 mm and a thickness of 12 μm. The volume ratio of fibers: sleeve: powder was 50:25:25. Because the preformed yarn was thick, it was difficult to smoothly wind the yarn around the aluminum alloy plate. The molded product had a tensile strength of 125.2 kg/mm$^2$ and a bending strength of 146.7 kg/mm$^2$. However, the mechanical strengths varied with test samples indicating the lack of uniformity.

EXAMPLE 3

A preformed yarn was prepared using the apparatus shown in FIG. 2 in a manner similar to that of Example 1. As the fibers, a bundle of polyphenylene sulfide fibers having a filament denier number of 9, a filament count of 400, a tensile strength of 7.1 kg/mm$^2$ and an elongation of 30% was used. As a thermoplastic resin for the formation of the sleeve, the same kind of polyphenylene sulfide as used in Example 1 was used. As the fine powder, a mixed powder composed of an equivalent volume of molybdenum disulfide and graphite was used. The molybdenum disulfide powder had a density of 4.80 g/cm$^3$ and an average specific surface area diameter of 3.2 μm and the graphite had a density of 2.10 g/cm$^3$ and an average specific surface area diameter of 5 μm. The volume ratio of the fibers, the mixed powder and the sleeve of the resultant yarn was 30:50:20. The preformed yarn thus obtained was cut into short lengths (3 mm) and the cut yarn was used as a raw material for the production of a molded article by injection molding. The molded article exhibited excellent slippage.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

We claim:

1. A preformed yarn consisting essentially of:
   a core of multiplicity of fibers, said core being 30–70% of the total volume of the preformed yarn;
   a fine powder of carbon, metal or metal compound provided in the interstices between said fibers; and
   a flexible sleeve formed of a thermoplastic resin and surroundings said core;
   said fine powder being present in an amount constituting about 0.01 to about 10% based on the volume of said fibers and being formed of a material which neither melts nor reacts with said thermoplastic resin neither at a temperature up to 450° C. nor at a temperature up to the melting point of said thermoplastic resin.

2. A preformed yarn according to claim 1, wherein said flexible sleeve has a thickness of about 5 to 1000 μm.

3. A preformed yarn according to claim 1, wherein said powder is graphite powder, carbon black powder, alumina powder, silica powder, calcium carbonate powder, calcium silicate powder, molybdenum dioxide powder, molybdenum disulfide powder, quartz powder, glass powder, hollow glass powder or tetrafluoroethylene powder.

4. A preformed yarn according to claim 1, wherein said fibers are formed of a material which does not melt at a temperature up to the melting point of said thermoplastic resin.

5. A preformed yarn according to claim 4, wherein said fibers are reinforcing fibers selected from carbon fibers, glass fibers, aramide fibers, boron fibers, ceramic fibers and metal fibers.

6. A preformed yarn according to claim 4, wherein said powder has an average specific surface area diameter of not greater than one third of the diameter of said fibers.

7. A preformed yarn according to claim 6, wherein said powder has an average specific surface area diameter of 15 μm or less.

8. A preformed yarn according to claim 1, wherein said powder is graphite powder, carbon black powder, alumina powder, silica powder, calcium carbonate powder, calcium silicate powder, molybdenum dioxide powder, molybdenum disulfide powder, quartz powder, glass powder or hollow glass powder.

* * * * *

UNITED STATES PATENT AND TRADEMARK OFFICE
CERTIFICATE OF CORRECTION

PATENT NO. : 5,206,085
DATED : April 27, 1993
INVENTOR(S) : NAKAGAWA et al It is certified that error appears in the above-identified patent and that said Letters Patent is hereby corrected as shown below:

Col. 4, line 18, "polyethylene 2,6,-naphthalate" should read --polyethylene-2,6,-naphthalate--.

Col. 6, line 45, after "plate" insert a comma --,--.

Col. 7, line 14, after "mm$^2$" insert a period --.---; and
line 29, after "mm$^2$" insert a period --.---.

Col. 8, line 26, delete "surroundings" insert --surrounding --.

Signed and Sealed this

Twenty-fifth Day of January, 1994

Attest:

BRUCE LEHMAN

*Attesting Officer*   *Commissioner of Patents and Trademarks*